Figure 1:
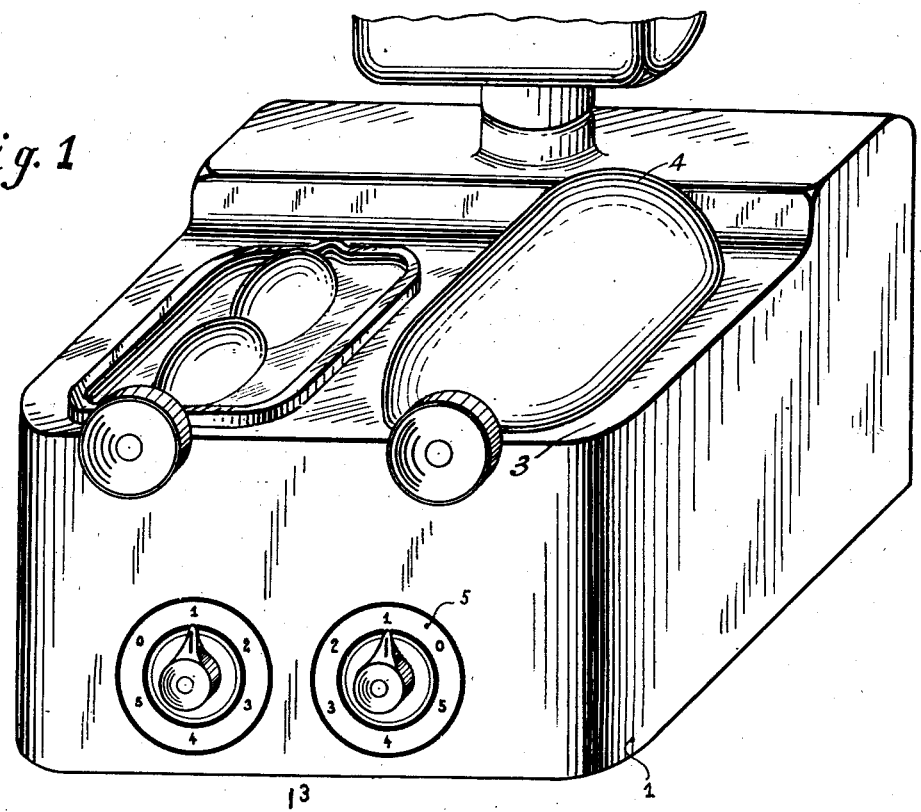

Aug. 19, 1941.  H. C. TUTTLE  2,253,154
STEAM GENERATOR, PARTICULARLY STEAM COOKING DEVICE
Filed Nov. 29, 1940  2 Sheets-Sheet 1

Inventor:
Harry C. Tuttle
BY Michael S.
  agent

Aug. 19, 1941.   H. C. TUTTLE   2,253,154
STEAM GENERATOR, PARTICULARLY STEAM COOKING DEVICE
Filed Nov. 29, 1940   2 Sheets-Sheet 2

Inventor:
Harry C. Tuttle

Patented Aug. 19, 1941

2,253,154

UNITED STATES PATENT OFFICE 2,253,154

STEAM GENERATOR, PARTICULARLY STEAM COOKING DEVICE

Harry C. Tuttle, New York, N. Y.

Application November 29, 1940, Serial No. 367,703

16 Claims. (Cl. 219—38)

My invention relates to steam generators in general, and more particularly to steam cooking devices for cooking eggs or other articles.

The main object of my invention is to accomplish practically instantaneous generation of steam when desired.

A further object of my invention is not only to provide for instantaneous generation of steam but to generate steam continuously also thereafter.

In accordance with my invention I attain the above objects by a new steam generator comprising in combination a stationary water container being adapted to contain the water to be vaporized, means for maintaining the water surface in this water container at a constant level, and an electrical resistance wire within this container; this wire should be bent and arranged in such a manner as to be only partially immersed in the water within the container, projecting at a series of points over the constant water level in this container.

By this arrangement I attain instantaneous steam generation when the resistance wire is heated: using a small amount of water, this water amount can be heated easily to the boiling point. The steam generated by the heated water under the action of the submerged portions of the resistance wire causes an ebullition of this quickly boiling water, and the water is splashed or bubbles against the unimmersed sections of the resistance wire, generating instant steam. This effect is further augmented by arranging the resistance wire partially immersed in the water, i. e. projecting at a series of points over the constant water level. Arranging the wire in this manner, the unimmersed wire portions become extremely hot and have a higher temperature than the immersed wire portions: thus, these wire portions exert the maximum of heat energy on the water at the points of entering the surface, with an effect of generating steam instantly.

This new method of generating steam is therefore a combination of a series of elements:

(a) Immersing the resistance wire within a small amount of water so that there is a very limited volume of water for dissipation of heat; thus, this small amount of water is quickly brought to the boiling point, generating steam quickly.

(b) Immersing this resistance wire only partially, whereby instantaneous steam generation is ensured at the points where the wire enters the water surface;

(c) Arranging the resistance wire in such a manner that it projects at a series of points over the constant water level, and close to it so that the ebullition of water causes it to splash on the unimmersed sections of the resistance coil at its hottest points, causing thus additional steam generation by evaporation of the small particles of water splashed thereon.

(d) Providing means being adapted to maintain the water surface in the water container at a constant level, making thereby continuous steam generation possible.

In accordance with a preferred embodiment of my invention I arrange the resistance wire within the water container in such a manner that the distance of each water particle from a point of the heated wire is not more than one-sixth of an inch. I am, preferably, using a container being shaped in such a way that the distance between the farthest points of the inner wall of this container from a point of the resistance wire is less than one-eighth of an inch, ensuring thereby quick boiling and evaporation of the water.

I have, furthermore, found it advantageous to use as resistance wire a resistance coil. When using such cylindrical resistance coil as heating element I prefer to use a longitudinal, e. g., semi-cylindrical container for the water to be vaporized. This container and the resistance coil are preferably arranged parallelly to each other. When using a semi-cylindrical water container and a cylindrical resistance coil I arrange these members co-axially, and form them in such a manner that the distance between the inner cylindrical wall of the container and the outer cylindrical surface of the coil is less than one-third of an inch. It is of advantage to shape the heating device in such a way that the distance between the inner wall of the container and the resistance wire is less than the radius of the resistance coil, i. e., that the radius of the resistance coil is only slightly less than the radius of the cylindrical water container.

For maintaining the water surface at a constant level different devices might be used:

Thus I may provide a water supply tank arranged above the constant level of the water surface in the container, and a supply pipe connecting this water tank with the container and reaching down to the desired water level into this container; the water supply tank should be closed on all sides except the water supply pipe, thus permitting the entry of air into the water tank and the flow of water to restore the water level in the water container when the water level in this container is lowered by evaporation.

I also may use for maintaining the water level in the container a valve in the pipe for supplying water to the container; this valve has to be operated automatically by changes in the water level in the container in such a manner as to maintain the required constant water level.

Figure 2:
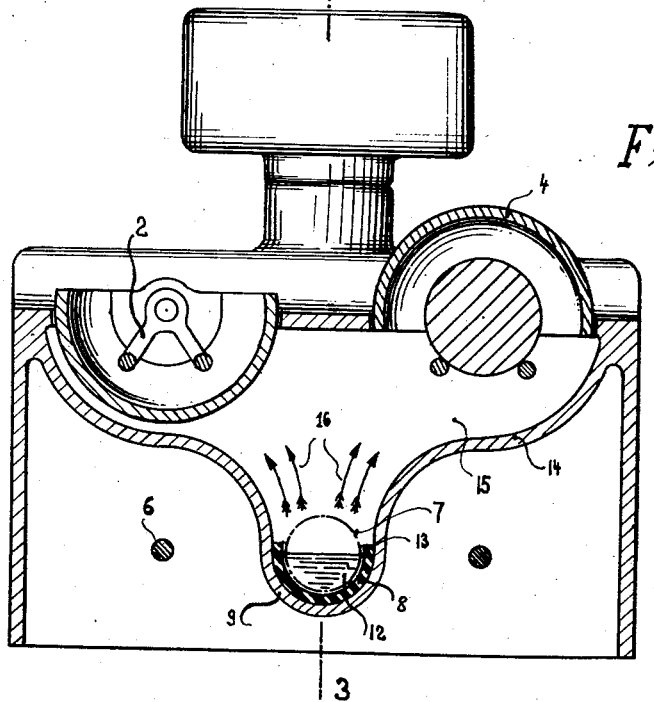
Figure 5:
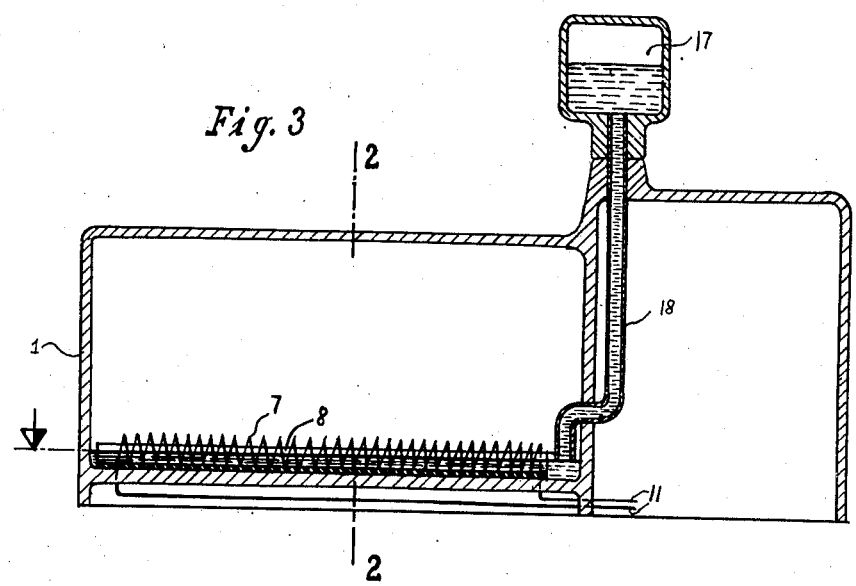
Figure 4:
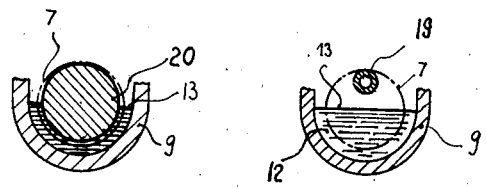

The novel features which I consider characteristic for my invention are set forth in particular in the appended claims. The invention itself, however, both as to its construction and its method of operation, together with additional objects and advantages thereof, will be best understood from the following description of specific embodiments, when read in connection with the accompanying drawings, in which:

Figure 1 is a perspective view of a cooking device embodying my invention,

Figure 2 is a cross section of this cooking device, taken on line 2—2 of Fig. 3, Figure 3 is a longitudinal section of the same cooking device, taken on line 3—3 of Fig. 2, and Figures 4 and 5 are two cross sections of modifications of the water-containing and heating means used for the egg-cooking device shown in Fig. 1.

The multiple cooking device shown in the drawings is especially adapted for cooking eggs, but may also be used for cooking other articles. It is adapted to cook one or two articles independently or simultaneously. For this purpose, on the upper face of housing 1 the carriers 2 are provided for the articles, e. g., eggs to be cooked. The independently adjustable means are provided one to be associated with each of the carriers to effect independent cooking of each of the articles in the different carriers. As these carriers and the means of operating them are not part of the present invention they will not be described in detail. It should only be explained that the articles, e. g., eggs are carried by stationary article-carriers 2, arranged on the upper face of the cooking device. Each of these carriers 2 is provided within a separate opening in the upper casing cover 3. Rotatable covers 4 are arranged for each article separately, in order to admit or to shut off the cooking steam generated within the housing of the cooking device. The indicating switches 5 in front of the cooking device are connected by rods 6 to the device for timing the cooking process, i. e., for regulating the duration of the connection between the electric circuit and the electric resistance wire producing the cooking steam. This timing device may be a conventional one; it forms no part of my present invention and is therefore neither illustrated in the drawings nor described in the following description.

In Fig. 2 the rotatable covers 4 are shown in two different positions: on the left side the cover is in a position shutting off the steam from the article-carrier 2 while on the right side the cover is in a position admitting the steam to this carrier. For generating the steam needed for cooking the electric resistance coil 7 is provided for. As the water container 9 is usually made of metal, I provide a trough-shaped insulating lining 8; the resistance coil 7 rests directly on the bottom of this lining 8. As shown in this figure, the diameter of the coil 7 is only slightly less than the diameter of the trough-shaped lining 8.

The ends 11 of the electric wire forming the resistance coil are to be connected to the timing device and the electrical circuit.

As shown in Figs. 2 and 3 of the drawings, the resistance coil is only partly immersed in the water 12 in container 9; thus, the upper portions of the convolutions of the coil 7 are projecting over the water level 13 within the water container. As evident, the use of a resistance coil, consisting of a great number of convolutions, has as consequence that these convolutions enter the water surface at a series of points; each of these points forms a separate contact-point between the water surface and the hot unimmersed upper convolution portion, causing thereby not only instantaneous steam generation, but also increasing the amount of generated steam.

As explained above, water bubbles resulting from the quick generation of steam through the use of a small amount of water, are projected by the steam on to the unimmersed portions of the coil causing additional steam.

As shown in Fig. 2, the walls 14 are shaped in such a manner as to hold the space 15 for the cooking steam as small as possible, and to direct the steam against the articles to be cooked, as shown by arrows 16.

Figs. 4 and 5 show modifications of the water-heating device, i. e., of the coil, the core, and the water container. Fig. 4 shows a cross-section of an arrangement in which the coil is supported by a core-like member 19 having a much smaller diameter than the coil. As shown in this figure, this member 19 is arranged above the constant water level 13.

This embodiment has the advantage that the entire surface of the coil is available to contact with the water either by immersion or by ebullition, thus enlarging the heating surface and improving the steam generation caused by the heated coil.

Fig. 5 shows another embodiment of my invention in which the resistance coil 7 is carried by an insulating core 8 and supported in the semi-cylindrical water container at its both ends by supports, not shown in the drawings. In this embodiment of my invention the entire outer surface of the coil is in contact with the water to be vaporized.

In order to hold the water surface in the semi-cylindrical water container 9 at a constant level, a water supply tank 17 is arranged behind casing 1. As shown in the drawings, this supply tank is arranged above the desired constant water level 13 and is connected with the water container 9 by a supply pipe 18. The water supply tank 17 and water supply pipe 18 are air-tight at all points except at the point where the water supply pipe reaches the desired water level 13 at which point the pipe approaches the water in a substantially vertical direction, causing the water, when its level reaches the orifice of the water supply pipe, to stop the further flow of water by reason of the law of atmospheric pressure. Conversely, when the water is evaporated by the generation of steam and the level of the water falls below the orifice of water supply pipe, air enters and a small amount of water flows restoring the water level, and again atmospheric pressure stops the further flow of water.

This water tank and supply pipe are working in the following way: If the water surface 13 in the container 9 is at a constant level, i. e., if the supply pipe reaches into the water, no flow of water from the supply pipe 18 is possible. If the water evaporates from the container 9, the water level in the container is lowered, permitting thereby the entry of air, by supply pipe 18, into the water tank and the flow of water from this tank restores the water level in the water container 9. This device works automatically, i. e., if the water tank 17 is filled with water, every time when the water level in the container is lowered by evaporation water flows from the supply tank into the container until the desired water level is restored. As shown in the drawings, this water tank is built as a separate unit, thus permitting filling of water into the tank when this is empty.

It will also be understood that each of the elements described above, or two or more together, may also find a useful application in other types of steam generators or steam cooking devices differing from the types described above.

While I have illustrated and described the invention as embodied in steam generators or steam cooking devices, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. In a steam cooking device steam-generating means comprising in combination a stationary water container being adapted to contain a relatively small amount of water to be vaporized, means for maintaining the water surface in said water container at a constant level, and a resistance wire within said container, said wire being bent and arranged in such a manner that it is immersed only partially in said water, projecting at a series of points above the constant water level in said container, and that the distance of each water particle from a point of said wire is not more than one sixth of an inch.

2. In a steam cooking device steam-generating means comprising in combination a stationary water container being adapted to contain a relatively small amount of water to be vaporized, means for maintaining the water surface in said water container at a constant level, and a resistance wire within said container, said wire being bent and arranged in such a manner that said wire is immersed only partially in the water, projecting at a series of points above the constant water level in said container, and that the distance between the farthest point of the inner wall of said container from a point of said wire is less than one-eighth of an inch.

3. A steam generator comprising in combination a stationary water container being adapted to contain the water to be vaporized, means for maintaining the water surface in said container at a constant level, and a resistance coil within said container, said resistance coil being arranged in such a manner that its convolutions are immersed only partially in said water and that they are projecting at a series of points over the constant water level in the container.

4. In a steam cooking device steam-generating means comprising in combination a stationary water container being adapted to contain a relatively small amount of water to be vaporized, means for maintaining the water surface in said container at a constant level, and a resistance coil within said container, said resistance coil being arranged in such a manner that its convolutions are immersed only partially in said water, and that they are projecting at a series of points over the constant water level in the container.

5. In a steam cooking device steam-generating means comprising in combination a stationary water container being adapted to contain a relatively small amount of water to be vaporized, means for maintaining the water surface in said water container at a constant level, and a resistance coil within said container, said coil being arranged in such a manner that its convolutions are immersed only partially in said water, projecting at a series of points over the constant water level in the container, and that the distance of each water particle from a point of said coil is not more than one sixth of an inch.

6. In a steam cooking device steam-generating means comprising in combination a stationary water container being adapted to contain a relatively small amount of water to be vaporized, means for maintaining the water surface in said container at a constant level, and a resistance coil within said container, said resistance coil being arranged in such a manner that its convolutions are immersed only partially in the water, projecting at a series of points over the constant water level in said water container, and that the distance between the farthest points of the inner wall of said container from a point of said coil is less than one-eighth of an inch.

7. A steam generator comprising in combination a stationary longitudinal container being adapted to contain the water to be vaporized, means for maintaining the water surface in said container at a constant level, and a longitudinal resistance coil, said resistance coil being arranged within said container substantially parallelly to the longitudinal direction of said container in such a manner that its convolutions are immersed only partially in said water and that they are projecting at a series of points over the constant water level in the container.

8. A steam generator comprising in combination a stationary longitudinal container being adapted to contain the water to be vaporized, means for maintaining the water surface in said container at a constant level, and a longitudinal resistance coil, said resistance coil being arranged within said container substantially parallelly to the longitudinal direction of said container in such a manner that its convolutions are immersed only partially in the water, projecting at a series of points over the constant water level in said water container, and that the distance between the farthest points of the inner wall of said container from a point of said coil is less than one-sixth of an inch.

9. A steam generator comprising in combination a stationary, substantially semi-cylindrical water container being adapted to contain the water to be vaporized, means for maintaining the water surface in said water container at a constant level, and a resistance coil, said resistance coil being arranged in such a manner that its convolutions are immersed only partially in said water and that they are projecting at a series of points over the constant water level in the container.

10. A steam generator comprising in combination a stationary, substantially semi-cylindrical water container being adapted to contain the water to be vaporized, means for maintaining the water surface in said water container at a constant level, and a resistance coil, said resistance coil being arranged in such a manner that its convolutions are immersed only partially in the water, projecting at a series of points over the constant water level in said container, and that the distance between the farthest points of the inner wall of said container from a point of said coil is less than one-sixth of an inch.

11. A steam generator comprising in combination a stationary, substantially semi-cylindrical water container being adapted to contain the water to be vaporized, means for maintaining the water surface in said water container at a constant level, and a cylindrical resistance coil being arranged within said stationary semi-cylindrical water container coaxially with said container in such a manner that its convolutions are immersed only partially in the water, projecting at a series of points over the constant water level in said container.

12. A steam generator comprising in combination a stationary, substantially semi-cylindrical water container being adapted to contain the water to be vaporized, means for maintaining the water surface in said water container at a constant level, and a cylindrical resistance coil being arranged within said stationary semi-cylindrical water container coaxially with said container in such a manner that its convolutions are only partially immersed in the water, projecting at a series of points over the constant water level in said container, and that the distance between the inner cylindrical wall of the container and the outer cylindrical surface of said coil is less than one-sixth of an inch.

13. A steam generator comprising in combination a stationary, substantially semi-cylindrical water container being adapted to contain the water to be vaporized, means for maintaining the water surface in said water container at a constant level, and a cylindrical resistance coil wound about a tubular core, the radius of said cylindrical coil being only slightly less than the radius of said cylindrical water container, said coil and core being arranged coaxially with said container in such a manner that the convolutions are immersed only partially in the water, projecting at a series of points above the constant water level in said container.

14. A steam generator comprising in combination a stationary, substantially semi-cylindrical water container being made of insulating material and being adapted to contain the water to be vaporized, means for maintaining the water surface in said water container at a constant level, and a cylindrical resistance coil being arranged within said stationary semi-cylindrical water container resting on the bottom of said container in such a manner that its convolutions are only partially immersed in the water, projecting at a series of points above the constant water level in said container, and that the distance between the inner cylindrical wall of the container and the outer cylindrical surface of said coil is less than the radius of said coil.

15. A steam generator comprising in combination a stationary, substantially semi-cylindrical water container being adapted to contain the water to be vaporized, means for maintaining the water surface in said water container at a constant level, a cylindrical resistance coil, the radius of said cylindrical coil being only slightly less than the radius of said cyindrical water container, said coil being arranged coaxially with said container in such a manner that its convolutions are immersed only partially in the water, projecting at a series of points above the constant water level in said container, a pipe for supplying water to the water container, and a valve in said pipe, said valve being operated automatically by changes in the water level in said container in such a manner as to maintain the required constant water level.

16. A steam generator comprising in combination a stationary, substantially semi-cylindrical water container being adapted to contain the water to be vaporized, means for maintaining the water surface in said water container at a constant level, a cylindrical resistance coil, the radius of said cylindrical coil being only slightly less than the radius of said cyindrical water container, said coil being arranged coaxially with said container in such a manner that its convolutions are immersed only partially in the water, projecting at a series of points above the constant water level in said container, a water supply tank arranged above the constant level of the water surface in the water container, and a supply pipe connecting said water tank with said water container and reaching down to the desired water level in said container, said water supply tank being closed on all sides except said water supply pipe, permitting thereby the entry of air into said water tank and the flow of water to restore the water level in said water container when the water level in the container is lowered by evaporation.

HARRY C. TUTTLE.